(12) United States Patent
Gerfast

(10) Patent No.: US 7,065,854 B2
(45) Date of Patent: Jun. 27, 2006

(54) ABUTTING CLINCH-JOINING METHOD

(76) Inventor: Sten R. Gerfast, 1802 Valley Curve Rd., Mendota Heights, MN (US) 55118

( * ) Notice: Subject to any disclaimer, the term of this patent is extended or adjusted under 35 U.S.C. 154(b) by 203 days.

(21) Appl. No.: 10/706,416

(22) Filed: Nov. 13, 2003

(65) Prior Publication Data

US 2005/0105964 A1     May 19, 2005

(51) Int. Cl.
*B23P 11/00* (2006.01)

(52) U.S. Cl. ............................. 29/505; 29/509; 29/521; 29/522.1; 29/525.01; 29/525.05; 403/292; 403/297

(58) Field of Classification Search ............... 29/505, 29/509, 521, 522.1, 525.01, 525.05, 524, 29/557; 40/700; 403/292, 293, 294, 297
See application file for complete search history.

(56) References Cited

U.S. PATENT DOCUMENTS

| | | | | | |
|---|---|---|---|---|---|
| 430,000 | A | * | 6/1890 | Clark et al. | 29/509 |
| 1,141,048 | A | * | 5/1915 | Dubus | 209/649 |
| 1,165,155 | A | * | 12/1915 | Smith et al. | 403/294 |
| 2,144,831 | A | * | 1/1939 | Burns | 192/107 R |
| 2,901,816 | A | * | 9/1959 | Smith et al. | 29/21.1 |
| 3,211,034 | A | * | 10/1965 | Andris | 83/137 |
| 3,334,211 | A | * | 8/1967 | Wheeler et al. | 219/78.16 |
| 3,729,804 | A | * | 5/1973 | Middleton | 29/432 |
| 3,934,327 | A | * | 1/1976 | Hafner | 29/432 |
| 5,121,537 | A | * | 6/1992 | Matsui et al. | 29/522.1 |
| 5,305,517 | A | * | 4/1994 | Schleicher | 29/798 |
| 5,678,946 | A | * | 10/1997 | Enami | 403/282 |

* cited by examiner

*Primary Examiner*—Jermie E. Cozart

(57) ABSTRACT

An in-expensive method to join metals or other materials by a slug that is compressed or clinched into a punched or machined substantially rectangular slot in two adjoining pieces. The final assembly is flat and of the same thickness as the clinched material. It could be used to advantage in a mitered frame type assembly.

7 Claims, 1 Drawing Sheet

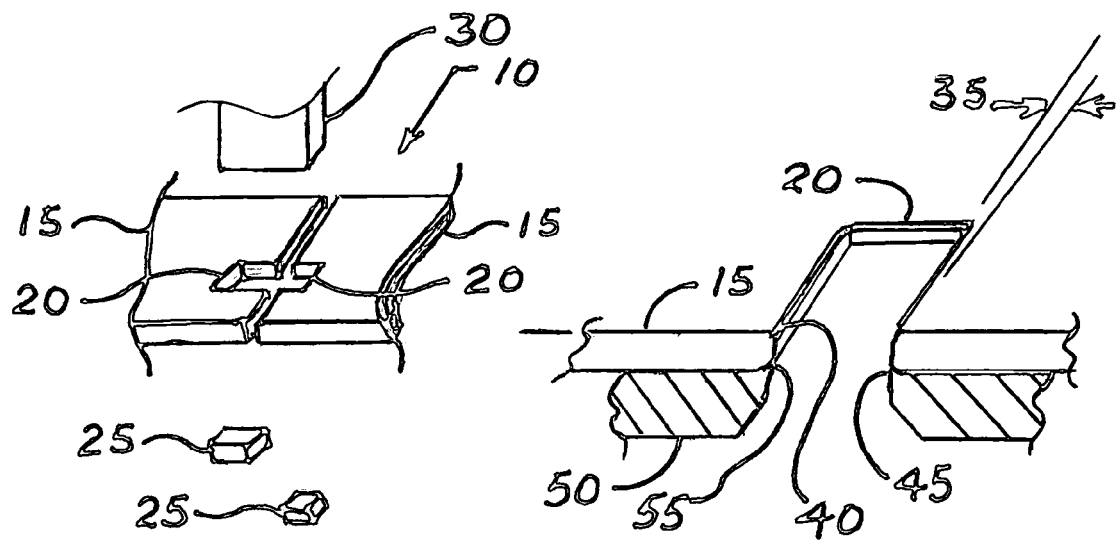
FIG. 1
FIG. 2
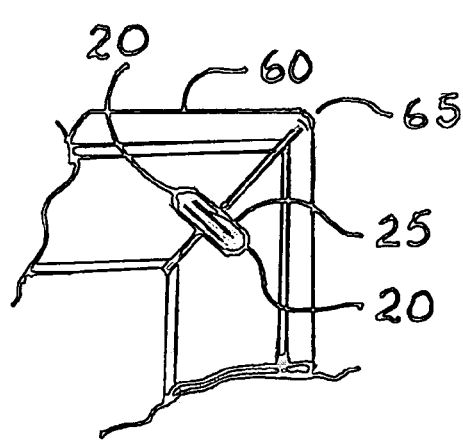
FIG. 3
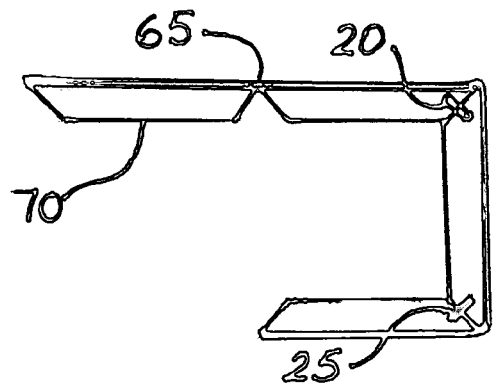
FIG. 4

ABUTTING CLINCH-JOINING METHOD

TECHNICAL FIELD

This invention relates to the joining of strips or shapes of metal and other malleable materials. It is also in the category of re-enforcement in the corners of support frames that is generally fabricated from a metal alloy. This re-enforcement, either in the corners of the frame, or in its structure, have been done by welding or by addition of parts that generally is attached with fasteners.

DESCRIPTION OF RELATED ART

Some metal strips or frames that are joined together and are fabricated by welding today, are either welded with gas or spot welded. Other types of assemblies that are being joined together are support frames and holders for mechanical components. Frames are generally strengthened by the addition of separate pieces that are riveted, or assembled with screws or other fasteners. This is also true with mitered frames where the corners generally have triangular parts fastened into the main frame.

Basically the only method to assemble strips or frame parts that are together side by side in a flat fashion is the gas welding method. Gas welding is both labor intensive and costly.

All the other fabrication methods mentioned above, require that two sheets or parts lying on top of each other before assembly. This is both increasing the total height and also total cost.

Additional rivet head or fasteners again increases the height and limits the space where other related components have to be placed. Rivets and screws are not expensive but the assembly labor is costly and increasing. Therefore there are limited design options if a totally flat assembly is required at a cost-effective price of manufacture.

THE PRESENT INVENTION

It is the object of the present invention to provide a joining method that can be totally flat with a low cost manufacturing process that is similar in nature to a stamping-press method. This method is rapid and the most cost effective of basically all manufacturing methods. This joining method of the present invention can be done without purchasing rivets or fasteners. If desired this clinching method could also be modified to work on malleable material.

It could be described as a:
Butt-joining method comprising:
in two abutting metal strips punching a substantially rectangular slot into both abutments, inserting into said two slots a deformable slug, clinching it into said slots, thereby securely joining said strips.

It could also be described as a:
Butt-joining clinch method comprising:
In two abutting metal strips punching a substantially rectangular slot into both abutments, using one knock-out-slug from said punching, re-inserting said slug into the center of said abutment, clinching it into said slots, thereby securely joining said strips.

Both the rectangular slots could have a slight keystone shape instead of having a strict rectangular shape, to further enhance the holding force during a pull-apart test of the joined strips. When a male punch initially enters a material on its downward stroke, it will be rounding (or coining) the material on its top side before the punch cuts trough the material. If the female die is designed with a protruding lip around the periphery of the die opening a similar rounding takes place on the bottom side of the material. This rounding is filled in with material from the slug when it is compressed or clinched into the slots.

Both of these rounding features are, without added cost, therefore used in the present invention to further enhance the holding force and to make a securely attached clinch joining method.

If a frame is fabricated from several mitered parts, they are sometimes mitered at 45 degrees that makes the two adjoining metal strips intersect at 45 degrees. This also makes it ideal for using this intersection as a point of clinching in the present invention. A large frame or sheet would benefit from a plurality of clinches. In one manufacturing method of mitered frames 90-degree cuts could be cut in a straight-line strip and then bent into a 90-degree corner.

The 90 degree cut could be cut such that it would leave a small remnant in the corner, so that when this frame is bent into a 90-degree corner, this remnant would hold the corner together until a clinching operation could be done. The above examples have shown only limited descriptions of where this invention is very useful, fast and in-expensive.

The illustrations of the present invention that are shown are by no means conclusive. A person skilled in the art could easily make many different configurations, uses and alterations.

BRIEF DESCRIPTION OF THE DRAWING

FIG. 1 is a view of the two adjoining pieces with its rectangular openings.

FIG. 2 is an enlarged view of the mentioned rounding and key-stoning.

FIG. 3 is a mitered corner of a frame with a clinched slug in place.

FIG. 4 is a fabrication sequence of a frame with a plurality of cuts.

DETAILED DESCRIPTION OF THE DRAWINGS

FIG. 1 shows the butt joining method 10 with two abutting metal strips 15 with punched rectangular slots 20 and also showing two knock-out-slugs 25. Above the strips is shown a male punch 30 in its retracted position. A female die is under the metal strips.

One of the knock-out-slugs 25 could be used for re-insertion into the center of the abutment and clinched by a secondary punch that would move up-wards to finish the joining.

FIG. 2 is an enlarged view of the mentioned rounding and key-stoning that shows a metal strip 15 with a slot that is slightly deviating from the rectangular, in a keystone shape 35. A rounding type edge 40 is shown on the top of 15 and a similar radius 45 is shown at the bottom of strip 15. A female die 50 with a protruding lip 55 is producing this bottom rounding feature.

FIG. 3 is a mitered corner of a frame 60 with a clinched slug 25 in place in two slots 20. A remnant 65, that is purposely left during mitering, holds the frame together until clinching of slug 25 can be done.

FIG. 4 is a fabrication sequence of a frame 70 with a plurality of 45-degree cuts. A remnant 65 is left in three places. Punched holes 20 is shown in one corner with a slug 25 shown inserted in another corner to achieve secure joining.

The invention claimed is:

1. Butt-joining clinch method comprising: In two abutting metal strips punching a substantially rectangular slot into both abutments, wherein said slots have two rounded edges produced by both a punch and a die, using one knock-out-slug from said punching, re-inserting said slug into the center of both said abutments, clinching said slug into said slots thereby securely butt-joining said strips.

2. Butt-joining clinch method as defined in claim 1 wherein said strips are of other material than metal.

3. Butt-joining clinch method as defined in claim 1 wherein clinching height produced by said clinching is flush or slightly below the surface of said strips.

4. Butt-joining clinch method as defined in claim 1 wherein said metal strips are mitered at 45 degrees and abutted at said mitering, with four said mitered strips forming a frame.

5. Butt-joining clinch method as defined in claim 4 wherein during said mitering remnants of said metal strips is purposely left at 45 degrees.

6. Butt-joining method comprising: In two abutting metal strips punching a substantially keystone shaped slot into both abutments, wherein said slots have two rounded edges produced by both a punch and a die, inserting into said two slots a deformable slug, clinching said slug into said slots, thereby securely butt-joining said strips.

7. Butt-joining clinch method as defined in claim 6 wherein a plurality of slots is used.

* * * * *